US012711743B2

(12) United States Patent
Feng et al.

(10) Patent No.: US 12,711,743 B2
(45) Date of Patent: Aug. 18, 2026

(54) METHOD AND DEVICE FOR IMAGE PROCESSING, AND ELECTRONIC DEVICE

(71) Applicant: Lenovo (Beijing) Limited, Beijing (CN)

(72) Inventors: Xiang Feng, Beijing (CN); Koji Kawakita, Beijing (CN); Sean Kelly, Morrisville, NC (US); Koichiro Ishigami, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 493 days.

(21) Appl. No.: 18/352,618

(22) Filed: Jul. 14, 2023

(65) Prior Publication Data

US 2025/0022254 A1 Jan. 16, 2025

(51) Int. Cl.

| | |
|---|---|
| ***G06V 10/82*** | (2022.01) |
| ***G06V 10/77*** | (2022.01) |
| ***G06V 10/80*** | (2022.01) |

(52) U.S. Cl.

CPC ........ *G06V 10/7715* (2022.01); *G06V 10/806* (2022.01); *G06V 10/82* (2022.01)

(58) Field of Classification Search

CPC .. G06V 10/7715; G06V 10/806; G06V 10/80; G06V 10/82; G06V 10/454; G06T 2207/20221; G06T 5/60; G06T 5/00; G06T 2207/20016; G06T 2207/20084; G06N 3/0464; G06N 3/02; G06N 3/0455

See application file for complete search history.

(56) References Cited

U.S. PATENT DOCUMENTS

2021/0232848 A1* 7/2021 Wang .................. G06N 3/0442
2023/0196520 A1* 6/2023 Lee .......................... G06N 3/02
382/255

* cited by examiner

*Primary Examiner* — Sumati Lefkowitz
*Assistant Examiner* — Michael Adam Shariff
(74) *Attorney, Agent, or Firm* — ANOVA LAW GROUP, PLLC

(57) ABSTRACT

An image processing method includes using different filter weights to process a multi-scale feature map obtained by encoding an initial image to obtain a target residual image after obtaining the initial image, and performing target processing on the initial image and the target residual image to obtain a target output image.

20 Claims, 9 Drawing Sheets

METHOD AND DEVICE FOR IMAGE PROCESSING, AND ELECTRONIC DEVICE

FIELD OF TECHNOLOGY

The present disclosure relates to the field of image processing technology and, more specifically, to an image processing method and device, and an electronic device.

BACKGROUND

When an image is collected by an imaging device, the light incident on the sensor may be attenuated and diffracted by the object, which may cause quality problems such as glare, noise, and color shift in the image collected by the imaging device. The problem of noise and color shift can be alleviated or solved by image signal processing (ISP). However, the glare of the image has not been effectively addressed.

SUMMARY

One aspect of the disclosure provides an image processing method including using different filter weights to process a multi-scale feature map obtained by encoding an initial image to obtain a target residual image after obtaining the initial image, and performing target processing on the initial image and the target residual image to obtain a target output image.

Another aspect of the disclosure provides a data processing device including a determination module, configured to use different filter weights to process a multi-scale feature map obtained by encoding an initial image to obtain a target residual image after obtaining the initial image, and a processing module, configured to perform target processing on the initial image and the target residual image to obtain a target output image.

Another aspect of the disclosure provides an electronic device including a processor and a memory storing an instruction set that, when executed, causes the processor to use different filter weights to process a multi-scale feature map obtained by encoding an initial image to obtain a target residual image after obtaining the initial image, and perform target processing on the initial image and the target residual image to obtain a target output image.

DETAILED DESCRIPTION

Hereinafter, aspects, features, and embodiments of the present disclosure will be described with reference to the accompanying drawings. Such description is illustrative only but is not intended to limit the scope of the present disclosure. In addition, it will be understood by those skilled in the art that various modifications in form and details may be made therein without departing from the spirit and scope of the present disclosure.

In the specification, terms such as "in one embodiment," "in another embodiment," "in an additional embodiment," or "in other embodiments" may all refer to one or more the same or different embodiments of the present disclosure, which can be combined with each other when there is no conflict.

In the following descriptions, the terms "first," "second," and "third" are merely intended to distinguish similar objects but does not necessarily indicate a specific order of an object. It may be understood that the terms "first," "second," and "third" are interchangeable in terms of a specific order or sequence if permitted, so that the embodiments of the present disclosure described herein can be implemented in a sequence in addition to the sequence shown or described herein. In the following description, the term "plurality" means at least two.

Unless otherwise defined, all the technical and scientific terms used in the present disclosure have the same or similar meanings as generally understood by one of ordinary skill in the art. As described in the present disclosure, the terms used in the specification of the present disclosure are intended to describe example embodiments, instead of limiting the present disclosure.

Figure 1:
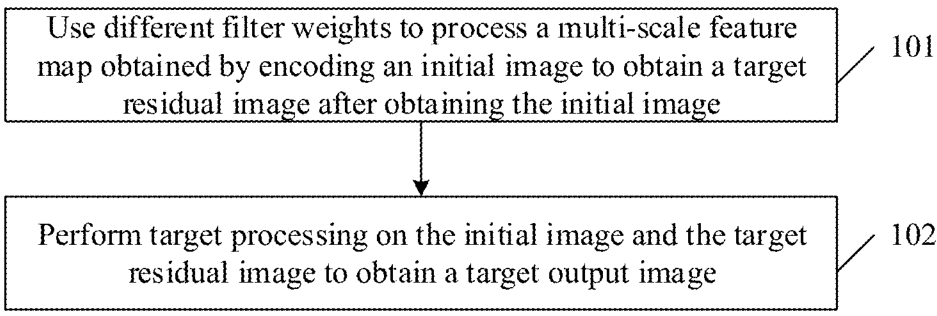
FIG. 1 is a flowchart of an image processing method according to an embodiment of the present disclosure.

FIG. 1 is a flowchart of an image processing method according to an embodiment of the present disclosure. The image detection method will be described in detail below.

101, using different filter weights to process a multi-scale feature map obtained by encoding an initial image to obtain a target residual image after obtaining the initial image.

In some embodiments, the initial image may be an original image collected by an image acquisition module, an image stored locally on the electronic device, or an image transmitted by other electronic devices, which is not limited in the embodiments of the present disclosure.

Figure 2:
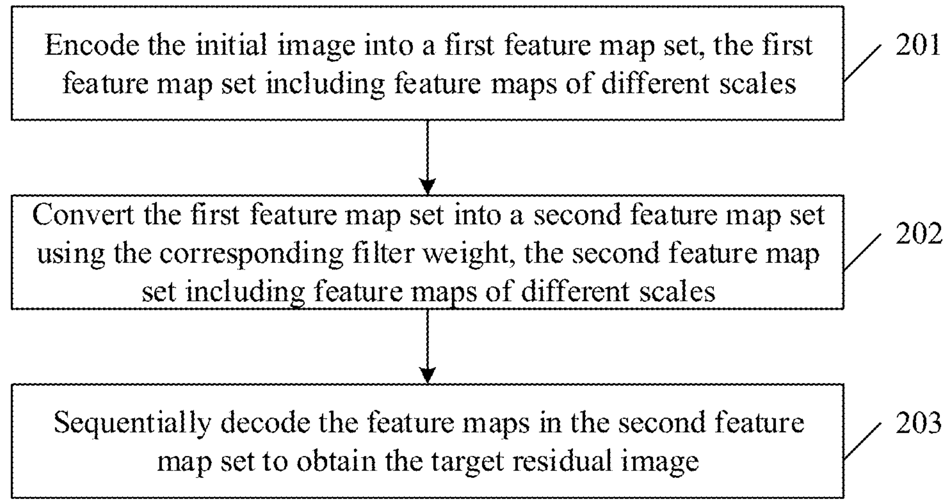
FIG. 2 is a process flowchart for obtaining a target residual image by using different filter weights to process a multi-scale feature map obtained by encoding an initial image according to an embodiment of the present disclosure.

In some embodiments, different filter weights may be used to process the multi-scale feature map obtained by encoding the initial image to obtain the target residual image. FIG. 2 is a process flowchart for obtaining the target residual image by using different filter weights to process the multi-scale feature map obtained by encoding the initial image according to an embodiment of the present disclosure. The process will be described in detail below.

201, encoding the initial image into a first feature map set, the first feature map set including feature maps of different scales.

Figure 3:
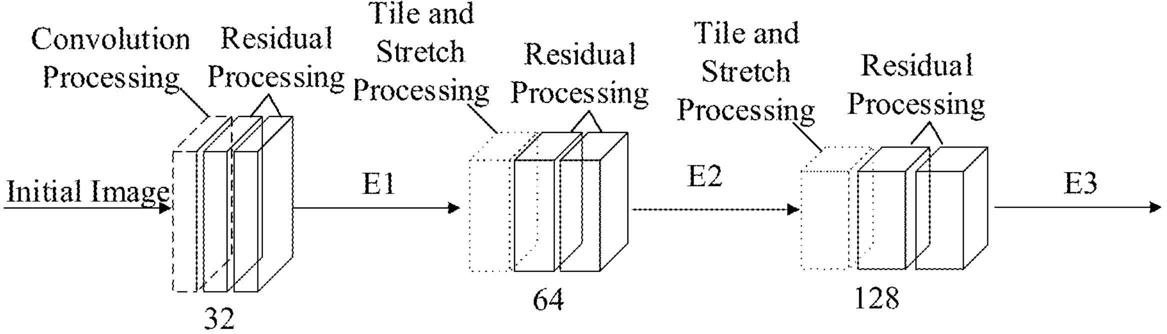
FIG. 3 is a schematic diagram of a specific implementation process of encoding the initial image into a first feature map set according to an embodiment of the present disclosure.

In some embodiments, the first feature map set may include a variety of feature maps of different scales. Take the first feature map set including a first feature map, a second feature map, and a third feature map of feature maps of three different scales as an example. A specific implementation process of encoding the initial image into the first feature map set, as shown in FIG. 3, may include performing convolution processing on the initial image, and then performing two consecutive residual processing on the initial image after the convolution processing to obtain the first feature map. In some embodiments, performing two consecutive residual processing on the initial image after the convolution processing may include performing the first residual processing on the initial image after the convolution processing to obtain a residual processing result, and performing the second residual processing on the residual processing result to obtain the first feature map.

In some embodiments, the second feature map may be obtained by performing tile and stretch processing on the first feature map, and then performing the residual processing on the feature map obtained by the tile and stretch processing twice. In some embodiments, performing the tile and stretch processing on the first feature map may include tiling and stretching the first feature map of fewer channels into a feature map of larger channels, such as tiling and stretching a first feature map of 32 channels into a feature map of 64 channels. In some embodiments, the tile and stretch processing of the first feature map may be realized by a convolution layer with a step size of two.

In some embodiments, the third feature map may be obtained by performing the tile and stretch processing on the second feature map, and then performing the residual processing on the feature map obtained by the tile and stretch processing twice. In some embodiments, performing the tile and stretch processing on the second feature map may include tiling and stretching the second feature map of fewer channels into a feature map of larger channels, such as tiling and stretching a second feature map of 64 channels into a feature map of 128 channels. In FIG. 3, the first feature map is represented by E1, the second feature map is represented by E2, and the third feature map is represented by E3. In some embodiments, the tile and stretch processing of the second feature map may be realized by a convolution layer with a step size of two.

202, converting the first feature map set into a second feature map set using the corresponding filter weight, the second feature map set including feature maps of different scales.

In some embodiments, the second feature map set may include a variety of feature maps of different scales. Take the second feature map set including a fourth feature map, a fifth feature map, and a sixth feature map of feature maps of three different scales as an example. A specific implementation process of converting the first feature map set into the second feature map set by using the corresponding filer weight may include performing convolution processing on the first feature map included in the first feature map set by using a first filter weight to obtain the fourth feature map in the second feature map set; performing convolution processing on the second feature map included in the first feature map set by using a second filter weight to obtain the fifth feature map in the second feature map set; and performing convolution processing on the third feature map included in the first feature map set by using a first filter weight to obtain the sixth feature map in the second feature map set. In some embodiments, the convolution processing on the first feature map, the second feature map, and the third feature map may be dynamic convolution processing. The first feature map may be represented by R1, the second feature map may be represented by R2, and the third feature map may be represented by R3. In some embodiments, the scale spaces corresponding to the first feature map, the second feature map, and the third feature map may be different, and the scale spaces corresponding to the fourth feature map, the fifth feature map, and the sixth feature map may be different.

In the embodiments of the present disclosure, a target condition vector may be used to guide the generation of the second feature map set including feature maps of different scales, thereby realizing feature extraction of different scales of the initial image.

In some embodiments, before performing the process at 101, the method may further include determining filter weights.

Figure 4:
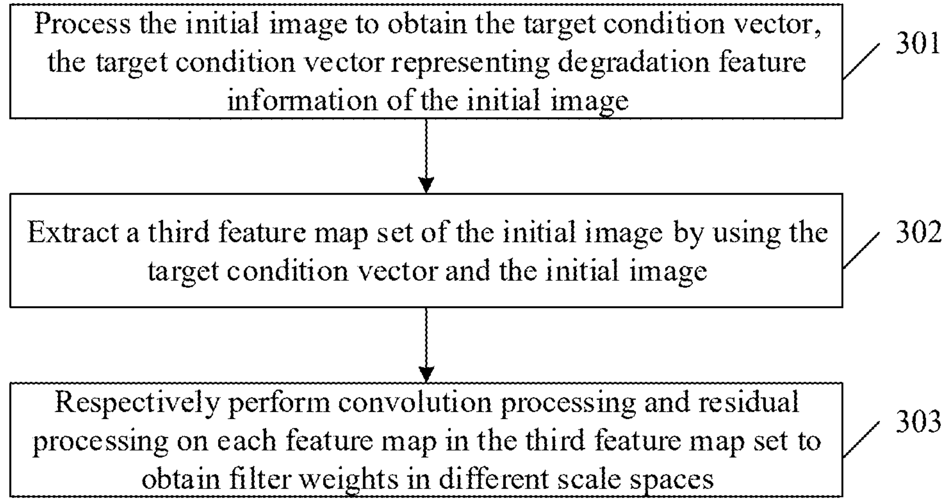
FIG. 4 is a flowchart for determining filtering weights according to an embodiment of the present disclosure.

In some embodiments, the process flow for determining the filter weights, as shown in FIG. 4, may include the following processes.

301, processing the initial image to obtain the target condition vector, the target condition vector representing degradation feature information of the initial image.

In some embodiments, in the process of forming, transmitting, and recording of the initial image, due to various reasons, the quality of the image will reduce, such as blur, distortion, noise, etc. of the image. The image with reduced quality can be referred to as a degraded image. Each degraded image has a corresponding degraded kernel, and the process of determining the degraded kernel of the image is well-known to those skilled in the art, and will not be repeated here.

In the embodiments of the present disclosure, when determining the target condition vector, the degraded kernel corresponding to the initial image may be determined first, and the degraded kernel corresponding to the initial image may be encoded as the target condition vector. The condition vector may be a one-dimensional array containing multiple channels.

Figure 5:
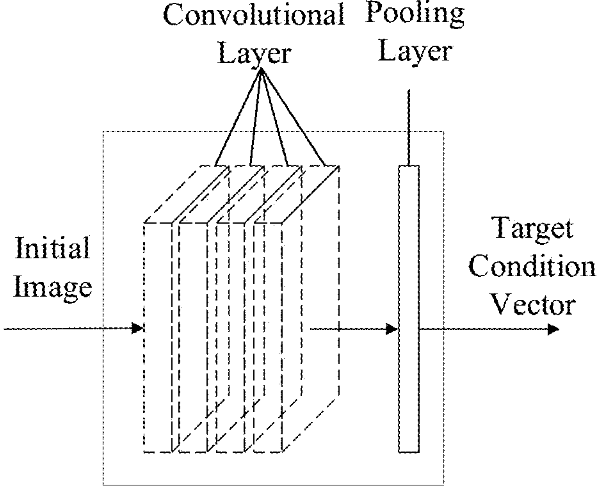
FIG. 5 is a schematic diagram of a specific implementation process of determining a target condition vector according to an embodiment of the present disclosure.

In a specific implementation, when determining the specific implementation process of the target condition vector, as shown in FIG. 5, the initial image may be input to four cascaded target conditional layers, and the output results of the four cascaded conditional layers may be processed by a global average pooling operator in a pooling layer to obtain the target condition vector.

302, extracting a third feature map set of the initial image by using the target condition vector and the initial image.

Figure 6:
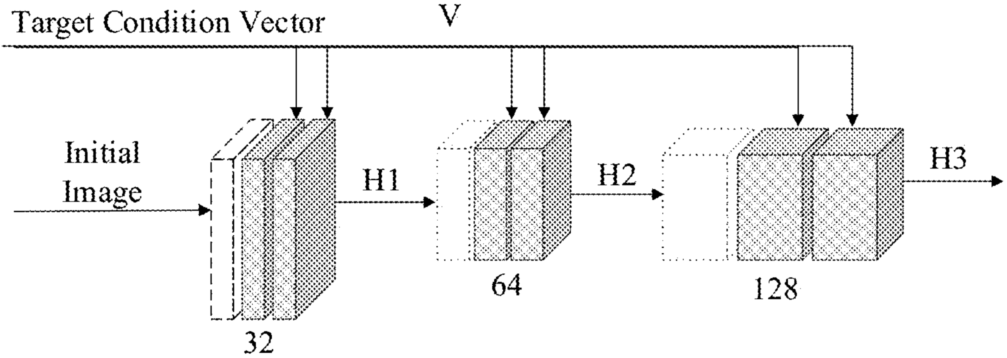
FIG. 6 is a schematic diagram of a process of extracting a third feature map set of the initial image according to an embodiment of the present disclosure.

In some embodiments, the process of extracting the third feature map set of the initial image may be as shown in FIG. 6, which includes converting the target condition vector to a first target condition vector, a second target condition vector, and a third target condition vector; using the first target condition vector to perform convolution and spatial feature conversion processing on the initial image to extract a first scale spatial feature map; using the second target condition vector to perform convolution and spatial feature conversion processing on the first scale spatial feature map to extract a second scale spatial feature map; and using the third target condition vector to perform convolution and spatial feature conversion processing on the second scale spatial feature map to extract a third scale spatial feature map. The third feature map set may include at least the first scale spatial feature map, the second scale spatial feature map, and the third scale spatial feature map. The first scale spatial feature map may be represented by H1, the second scale spatial feature map may be represented by H2, and the third scale spatial feature map may be represented by H3.

In some embodiments, the first target condition vector may have the same shape as the first scale spatial feature map, the second target condition vector may have the same shape as the second scale spatial feature map, and the third target condition vector may have the same shape as the third scale spatial feature map.

In the embodiments of the present disclosure, the first target condition vector and the first scale spatial feature map may refer to: the length of the feature map corresponding to the first target condition vector is the same as the length of the first scale spatial feature map, the width of the feature map corresponding to the first target condition vector is the same as the width of the first scale spatial feature map, and the number of channels of the feature map corresponding to the first scale spatial feature map and the number of channels of the first scale spatial feature map may be the same or different. The second target condition vector and the second scale spatial feature map may refer to: the length of the feature map corresponding to the second target condition vector is the same as the length of the second scale spatial feature map, the width of the feature map corresponding to the second target condition vector is the same as the width of the second scale spatial feature map, and the number of channels of the feature map corresponding to the second scale spatial feature map and the number of channels of the second scale spatial feature map may be the same or different. The third target condition vector and the third scale spatial feature map may refer to: the length of the feature map corresponding to the third target condition vector is the same as the length of the third scale spatial feature map, the width of the feature map corresponding to the third target condition vector is the same as the width of the third scale spatial feature map, and the number of channels of the feature map corresponding to the third scale spatial feature map and the number of channels of the third scale spatial feature map may be the same or different.

In some embodiments, the process of extracting the third feature map set of the initial image by using the target condition vector and the initial image may include converting the target condition vector into a ninth feature map having the same shape as an input feature map of a different scale space of the initial image; merging different ninth feature maps with the input feature map of the corresponding scale space into a tenth feature map; performing convolution processing on different tenth feature maps to obtain the corresponding feature tensors; using the feature tensors to perform spatial feature conversion processing on the input feature map corresponding to the scale space to obtain the third feature map set including multi-scale space feature maps.

In some embodiments, the different ninth feature maps may include a ninth feature map corresponding to the first target condition vector, a ninth feature map corresponding to the second target condition vector, and a ninth feature map corresponding to the third target condition vector.

Correspondingly, the process of merging different ninth feature maps with the input feature map corresponding to the scale space into the tenth feature map may include 1) merging the ninth feature map corresponding to the first target condition vector with the initial feature map to obtain a first tenth feature map corresponding to the scale of the initial feature map, performing convolution processing on the first tenth feature map to obtain the corresponding feature tensor, and using the feature tensor to perform spatial feature conversion processing on the initial feature map to obtain the first scale spatial feature map. 2) Fusing the ninth feature map corresponding to the second target condition vector with the first scale spatial feature map processed by tiling and stretching to obtain a corresponding second tenth feature map, performing convolution processing on the second tenth feature map to obtain the corresponding feature tensor, and using the feature tensor to perform spatial feature conversion processing on the tiled and stretched first scale spatial feature map to obtain the second scale spatial feature map. 3) Fusing the ninth feature map corresponding to the third target condition vector with the second scale spatial feature map processed by tiling and stretching to obtain a corresponding third tenth feature map, performing convolution processing on the third tenth feature map to obtain the corresponding feature tensor, and using the feature tensor to perform spatial feature conversion processing on the tiled and stretched second scale spatial feature map to obtain the third scale spatial feature map.

The first scale spatial feature map, the second scale spatial feature map, and the third scale spatial feature map may constitute the third feature map set. In the embodiments of the present disclosure, both the first scale spatial feature map and the second scale spatial feature map may be tiled and stretched by a convolutional layer with a step of two.

Figure 7:
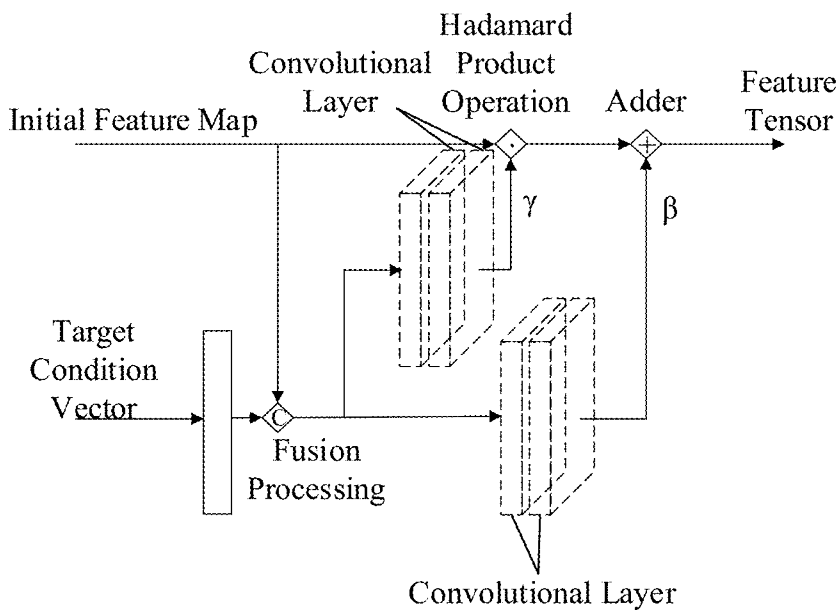
FIG. 7 is a schematic diagram of a process of determining a first scale space feature map in the third feature map set according to an embodiment of the present disclosure.

In a specific implementation, the process of determining the first scale spatial feature map in the third feature map set may be as shown in FIG. 7. In this process, the target condition vector may be stretched into a first target condition vector of the same shape as the initial feature map of the initial image, which can be transformed into the first ninth feature map corresponding to the initial feature map. The first ninth feature map and the initial feature map may be merged to obtain the first tenth feature map (alternatively, the feature map obtained by tiling and stretching the target condition vector may be connected with the initial feature map to obtain the first tenth feature map). The convolution processing may be performed on the first tenth feature map to obtain a feature tensor, and the feature tensor may be used to perform spatial feature conversion processing on the first tenth feature map to obtain the first scale spatial feature map.

In some embodiments, the process of performing convolution processing on the first tenth feature map to obtain the feature tensor may be realized by two groups of independent continuous convolutional layers as shown in FIG. 7, and the feature tensor may be expressed as $(\gamma, \beta)$.

Figure 8:
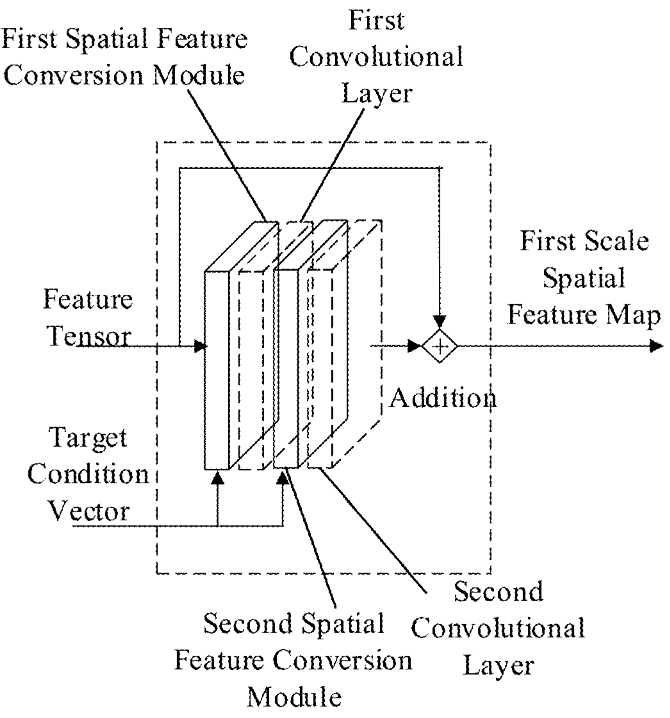
FIG. 8 is a schematic diagram of a process of determining the first scale space feature map in based on a feature tensor and the target condition vector according to an embodiment of the present disclosure.

In some embodiments, based on the feature tensor and the first target condition vector, the process of determining the first scale spatial feature map may be as shown in FIG. 8. The first spatial feature conversion module in FIG. 8 may be used to realize the process of determining the first scale spatial feature map in the third feature map set in FIG. 7. More specifically, after the feature tensor input by the first spatial feature conversion module is processed by the first convolutional layer, the obtained convolution results and the first target condition vector may be input to the second spatial feature conversion module. After the second spatial feature conversion module performs the same operation as the first spatial feature conversion module, the output result may be processed by the second convolutional layer to output the first scale spatial feature map.

The above description takes the acquisition of the first scale spatial feature map as an example for illustration. In a specific implementation, the process obtaining the second scale spatial feature map and the third scale spatial feature map may be similar to the process of obtaining the first scale spatial feature map, the difference being that when obtaining the second scale spatial feature map, the target condition vector may be stretched into the second target condition vector with the same shape as the first scale spatial feature map, and when obtaining the third scale spatial feature map, the target condition vector may be stretched into the third target condition vector with the same shape as the second scale spatial feature map. As an example, the first scale spatial feature map may be represented by H1, which is a feature map of 32 channels; the second scale spatial feature map may be represented by H2, which is a feature map of 64 channels; and the third scale spatial feature map may be represented by H3, which is a feature map of 128 channels.

303, respectively performing convolution processing and residual processing on each feature map in the third feature map set to obtain filter weights in different scale spaces.

In some embodiments, each feature map in the third feature map set may be sequentially subjected to a first convolution processing, two residual processing, and a second convolution processing to obtain a first filter weight F1, a second filter weight F2, and a third filter weight F3 corresponding to each feature map. In some embodiments, a 3*3 convolutional layer may be used for the first convolution processing, and a 1*1 convolutional layer may be used for the second convolution processing.

In the embodiments of the present disclosure, filter weights in different scale spaces may cope with the distortion of local changes in image space and improve the accuracy of image feature extraction.

203, sequentially decoding the feature maps in the second feature map set to obtain the target residual image.

Figure 9:
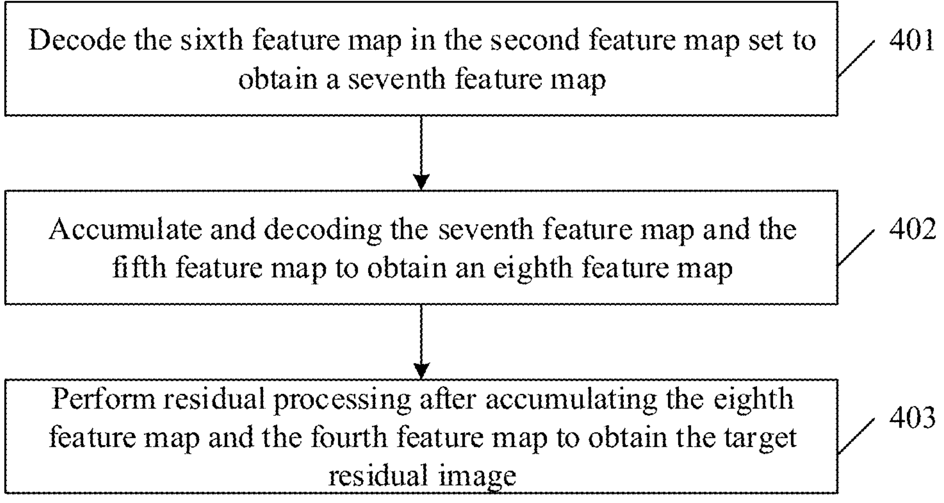
FIG. 9 is a schematic diagram of a process of sequentially decoding the feature maps in a second feature map set to obtain the target residual image according to an embodiment of the present disclosure.

In some embodiments, the process of sequentially decoding the feature maps in the second feature map set to obtain the target residual may be as shown in FIG. 9, which may include the following processes.

401, decoding the sixth feature map in the second feature map set to obtain a seventh feature map.

In some embodiments, convolution processing may be performed on the sixth feature map, then a pixel reorganization operator may be used to perform pixel reorganization processing on the result obtained by the convolution processing, thereby realizing the decoding process of the sixth feature map and obtaining the seventh feature map. In some embodiments, the scale space corresponding to the seventh feature map may be the same as the scale space of the fifth feature map.

402, accumulating and decoding the seventh feature map and the fifth feature map to obtain an eighth feature map.

In some embodiments, an adder may be used to perform cumulative processing on the seventh and the fifth feature maps based on pixels to obtain the feature map after the cumulative processing. Subsequently, the accumulated feature map may be decoded to obtain the eighth feature map.

In some embodiments, convolution processing may be performed on the accumulated feature map, and then the pixel reorganization processing may be performed on the result obtain ted by the convolution processing by using a pixel reorganization operator to obtain the eighth feature map.

403, performing residual processing after accumulating the eighth feature map and the fourth feature map to obtain the target residual image.

In some embodiments, an adder may be used to perform cumulative processing on the eighth and the fourth feature maps based on pixels to obtain the feature map after the cumulative processing. Subsequently, residual processing may be performed on the feature map after cumulative processing to obtain the target residual image.

In some embodiments, two consecutive residual processing may be performed on the accumulated feature map. For example, the first residual processing may be performed on the accumulated feature map to obtain the residual processing result, and then the second residual processing may be performed on the residual processing result to obtain the target residual image.

102, performing target processing on the initial image and the target residual image to obtain a target output image.

In some embodiments, the initial image and the target residual image maybe superimposed and/or fused to obtain the target output image.

Consistent with the present disclosure, only the initial image, and not the PSF information corresponding to the acquisition device of the initial image is needed to eliminate the glare in the original image and obtain a clear image corresponding to the original image.

An application scenario of the image processing method provided in the embodiments of the present disclosure is to eliminate glare of an image collected by an under-screen camera of a smart electronic device. The under-screen camera can capture images under the screen of the smart electronic device to provide the user experience of viewing images in full screen on the smart electronic device. Under-screen cameras can be used in many scenarios including video conferencing. In the under-screen camera system, the camera is placed under a translucent organic light-emitting diode (OLED) screen and is closely connected to the OLED screen. The microstructure of the OLED screen pixel array allows light to pass through the gaps between the screen pixels, but this will attenuate and diffract the light incident from the object to the sensor, which will cause glare in the image collected by the camera.

Figure 10:
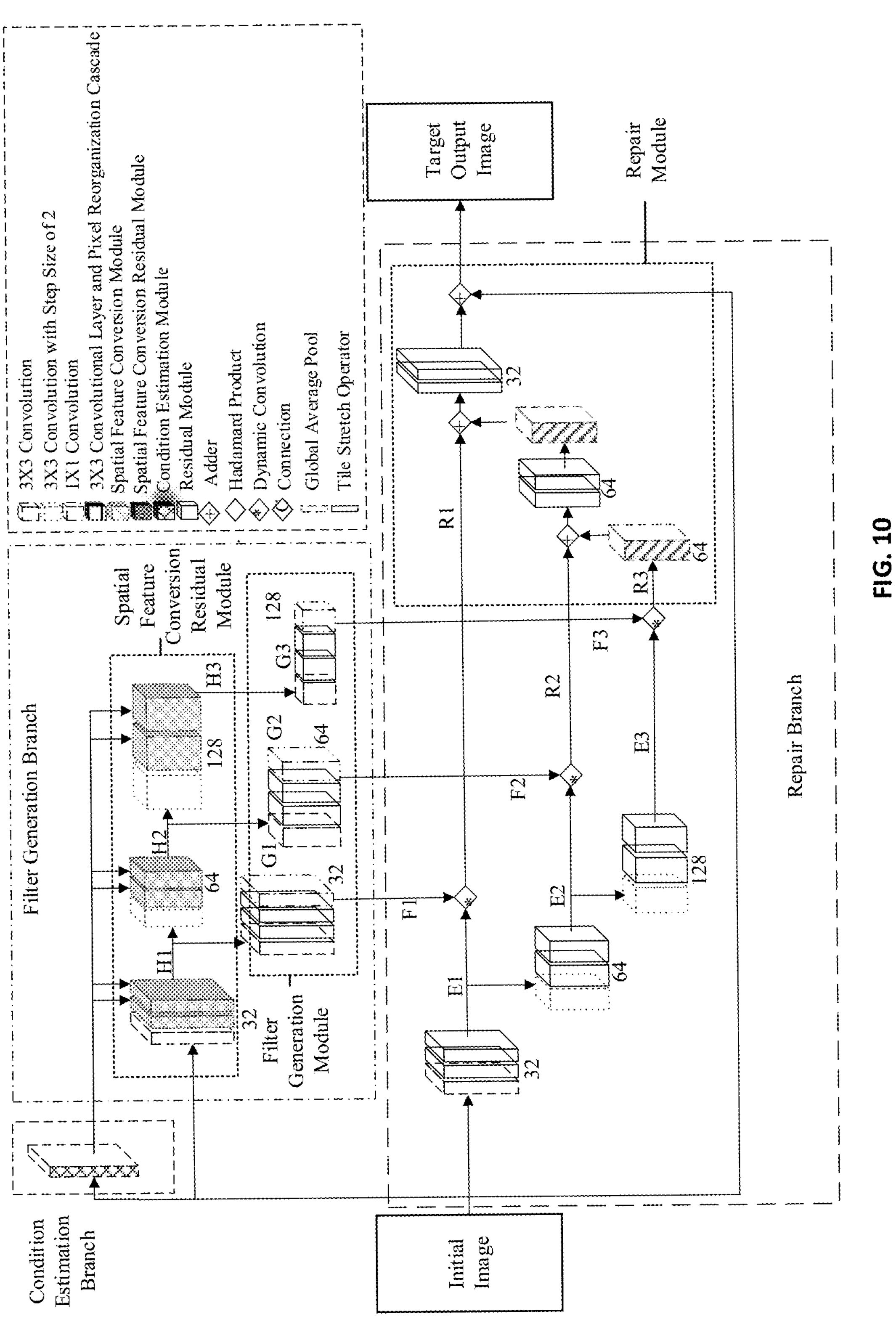
FIG. 10 is a schematic diagram of an image processing process of a to-be-processed image collected by an off-screen camera according to an embodiment of the present disclosure.

As shown in FIG. 10, in the image processing process of a to-be-processed image collected by the under-screen camera, the to-be-processed image collected by the under-screen camera is input to a condition estimation branch to obtain the target condition vector output by the condition estimation score module. The target condition vector and the to-be-processed image are input to a filter generation branch to obtain the first scale spatial feature map Ha, the second scale spatial feature map H2, and the third scale spatial feature map H3 in the third feature map set. In some embodiments, the structure of the spatial feature conversion residual module in the filter generation branch may be the structure shown in FIG. 8. The spatial feature conversion residual module may include a skip connection and a module including two spatial feature conversion modules alternately cascaded with two convolutional layers. The spatial feature conversion residual module may guide the local feature calculation of the to-be-processed image by combining the target condition vector, and have the ability to refine and transform the intermediate feature map.

In some embodiments, the first scale spatial feature map H1, the second scale spatial feature map H2, and the third scale spatial feature map H3 in the third feature map set may be respectively input to the corresponding filter generation module to obtain the filter weighs of three different scale spaces (e.g., the first filter weight F1, the second filter weight F2, and the third filter weight F3). The filter generation module may be used to realize the process at 102.

In some embodiments, the to-be-processed image may be input to a repair branch to obtain the first feature map E1, the second feature map E2, and the third feature map E3 in the first feature map set. The first filter weight F1 may be used to perform convolution processing on the first feature map E1 to obtain the fourth feature map R1, the second filter weight F2 may be used to perform convolution processing on the second feature map E2 to obtain the fifth feature map R2, and the third filter weight F3 may be used to perform convolution processing on the third feature map E3 to obtain the sixth feature map R3.

In some embodiments, a repair module in the repair branch may be used to execute the operation flow shown in FIG. 5, and determine the target residual image based on the fourth feature map R1, the fifth feature map R2, and the sixth feature map R3.

Subsequently, the target residual image and the to-be-processed image may be fused or superimposed to obtain the target output image.

Figure 11:
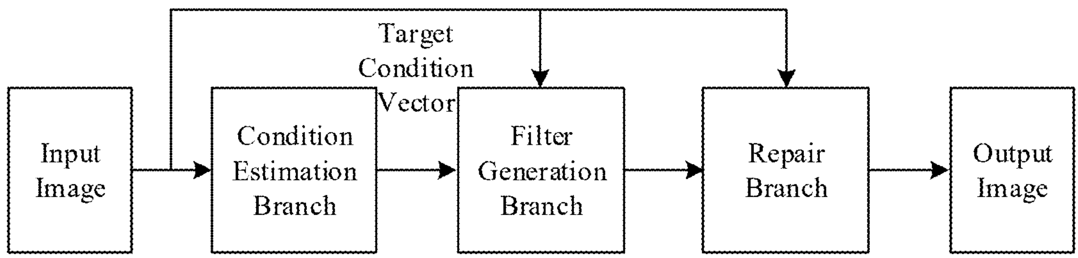
FIG. 11 is an architecture diagram of the imaging processing method according to an embodiment of the present disclosure.
Figure 12:
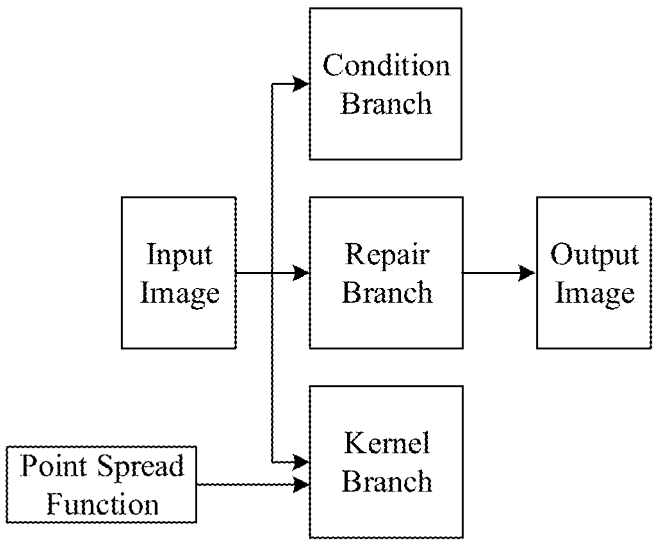
FIG. 12 is a first architecture diagram of the image processing method in the related art according to an embodiment of the present disclosure.
Figure 13:
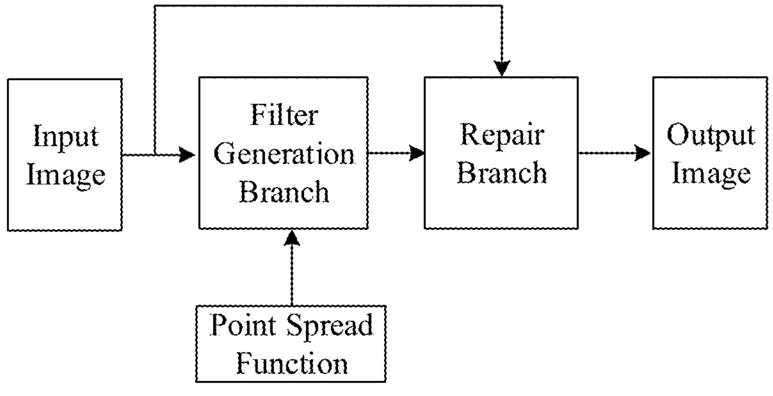
FIG. 13 is a second architecture diagram of the image processing method in the related art according to an embodiment of the present disclosure.

FIG. 11 is an architecture diagram of the imaging processing method according to an embodiment of the present disclosure. As shown in FIG. 11, the target condition vector may be obtained after the input image is processed by the condition estimation branch. The filter generation branch may be configured to generate filter weights based on the input image and the target condition vector, and the repair branch may be configured to obtain the output image based on the filter weights and the input image. Compared with the first architecture diagram of the image processing method in the related art shown in FIG. 12 and the second architecture diagram of the image processing method in the related art shown in FIG. 13, the architecture diagram of the image processing method provided by the embodiments of the present disclosure can obtain a clear output image without specifying the point spread function.

Figure 14:
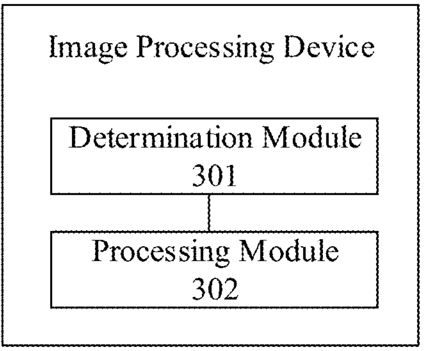
FIG. 14 is a structural block diagram of an image processing device according to an embodiment of the present disclosure.

An embodiment of the present disclosure also provides an image processing device. FIG. 14 is a structural block diagram of an image processing device according to an embodiment of the present disclosure. As shown in FIG. 14, the image processing device includes a determination module 501 and the processing module 502. The determination module 501 may be configured to process the multi-scale feature map obtained by encoding the initial image by using different filter weights to obtain the target residual image after obtaining the initial image. The processing module 502 may be configured to perform target processing on the initial image and the target residual image to obtain the target output image.

In some embodiments, the determination module 501 may be configured to encode the initial image into a first feature map set, the first feature map set including feature maps of different scales; convert the first feature map set into the second feature map set by using the corresponding filter weights, the second feature map set including feature maps of different scales; and sequentially decoding the feature maps in the second feature map set to obtain the target residual image.

In some embodiments, the determination module 501 may be configured to perform convolution processing on the first feature map included in the first feature map set by using the first filter weight to obtain the fourth feature map in the second feature map set; perform convolution processing on the second feature map included in the first feature map set by using the second filter weight to obtain the fifth feature map in the second feature map set; and perform convolution processing on the third feature map included in the first feature map set by using the third filter weight to obtain the sixth feature map in the second feature map set.

In some embodiments, the determination module 501 may be configured to perform decoding processing on the sixth feature map to obtain a decoded sixth feature map; perform cumulative processing on the decoded sixth feature map and the fifth feature map to obtain the fifth feature map after cumulative processing; decode the accumulated fifth feature map to obtain the decoded fifth feature map; perform accumulative processing on the decoded fifth feature map and the fourth feature map to obtain an accumulative fourth feature map; and perform residual processing on the accumulated fourth feature map to obtain the target residual image.

In some embodiments, the processing module 502 may be configured to process the initial image to obtain the target condition vector, the target condition vector representing the degradation feature information of the initial image; use the target condition vector and the initial image to extract the third feature map set of the initial image; and perform convolution and residual processing on each feature map in the third feature map set to obtain filter weights in different scale spaces.

In some embodiments, the processing module 502 may be configured to extract the degraded features of the initial image, and determine the target condition vector based on the degraded features.

In some embodiments, the processing module 502 may be configured to use the first target condition vector to perform convolution and spatial feature conversion processing on the initial image to extract the first scale spatial feature map, the first target condition vector having the same shape as the first scale spatial feature map; use the second target condition vector to perform convolution and spatial feature conversion processing on the first scale spatial feature map to extract the second scale spatial feature map, the second target condition vector having the same shape as the second scale spatial feature map; and use the third target condition vector to perform convolution and spatial feature conversion processing on the second scale spatial feature map to extract the third scale spatial feature map, the third target condition vector having the same shape as the third scale spatial feature map. In some embodiments, the first target condition vector, the second target condition vector, and the third target condition vector may be obtained based on conversion processing of the target condition vector.

In some embodiments, the processing module 502 may be configured to convert the target condition vector into the ninth feature map having the same shape as the input feature map in a different scale space of the initial image; fuse different ninth feature maps with the input feature map corresponding to a scale space into the tenth feature map; perform convolution processing on different tenth feature maps to obtain corresponding feature tensors; and use the feature tensors to perform spatial feature conversion processing on the input feature map corresponding to the scale space to obtain the third feature map set including the multi-scale space feature map.

An embodiment of the present disclosure also provides an electronic device. The electronic device may include at least one processor, and a memory communicatively connected to the at least one processor. The memory stores instructions that can be executed by the at least one processor, and the instructions may be executed by the at least one processor, such that the at least one processor can execute the image processing method described above.

Figure 15:
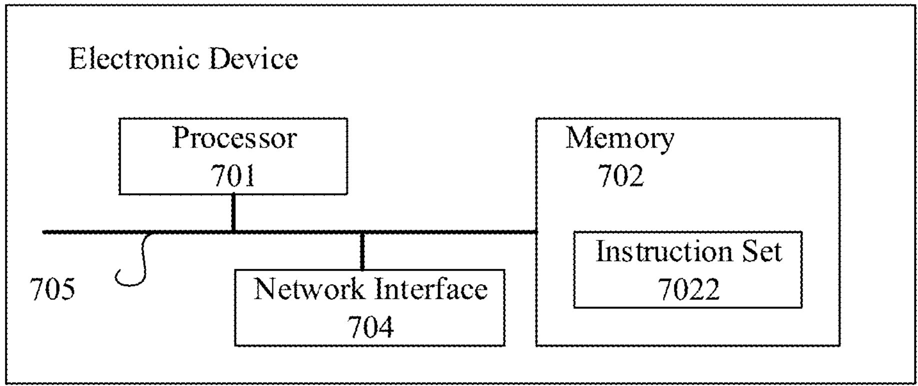
FIG. 15 is a structural block diagram of an electronic device according to an embodiment of the present disclosure.

FIG. 15 is a structural block diagram of an electronic device 700 according to an embodiment of the present disclosure. The electronic device 700 may include at least one processor 701, a memory 702, and at least one network interface 704. Various parts in the electronic device 700 may be coupled together through a bus system 705. It can be understood that the bus system 705 can be used to realize the connection and communication between these parts. In addition to the data bus, the bus system 705 may also include a power bus, a control bus, and a status signal bus. However, for clarity of the description, various buses are marked as the bus system 705 in FIG. 15.

In embodiments of the present disclosure, the memory 702 may include volatile memory or non-volatile memory, or may also include both the volatile and non-volatile memory. The non-volatile memory may include read-only memory (ROM), programmable read-only memory (PROM), erasable programmable read-only memory (EPROM), electrically erasable programmable read-only memory (EEPROM), ferromagnetic random-access memory (FRAM), flash memory, magnetic surface memory, disc, or compact disc read-only memory (CD-ROM). The magnetic surface memory may include magnetic disk storage or magnetic tape storage. The volatile memory may include a random-access memory (RAM), which is used as an external high-speed cache. The present embodiment is merely exemplary but not limited, many forms of RAM are available, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced type synchronous dynamic random access memory (ESDRAM), SyncLink dynamic random access memory (SLDRAM), direct memory bus random access memory (DRRAM). The memories described in embodiments of the present disclosure are intended to include but are not limited to these and any other suitable types of memories.

The memory 702 can store various types of data to support the operation of the electronic device 700. The data may include any computer program to be operated on the electronic device 700, such as an instruction set 7022. In some embodiments, the instructions for implementing the image processing method provided by the embodiments of the present disclosure may be included in the instruction set 7022.

The image processing method described the foregoing embodiments of the present disclosure may be applied to the processor 701 or implemented by the processor 701. The processor 701 may be an integrated circuit chip with signal processing capabilities. In an implementation process, each step of the foregoing method may be completed by an integrated logic circuit of hardware or an instruction in a form of software in the processor 701. The processor 701 may be a general-purpose processor, a digital signal processor (DSP), or other programmable logic device, a discrete gate or transistor logic device, a discrete hardware component, etc. The processor 701 can implement or perform the various methods, steps, and logic blocks disclosed in the embodiments of the present disclosure. The general-purpose processor can be a microprocessor or any conventional processor, etc. The steps of the method disclosed in the embodiments of the present disclosure may be directly implemented by a hardware decoding processor, or may be performed by software modules or units, or performed by a combination of hardware and software modules/units in the decoding processor. The software module can be included in a storage medium. The storage medium may be in memory 702. The processor 701 can read information from and store information into the memory 701, to in conjunction with the hardware, perform the functions of the software modules/units.

In an exemplary embodiment, the electronic device 700 may be configured by one or more application specific integrated circuits (ASICs), DSPs, programmable logic devices (PLDs), complex programmable logic devices (CPLDs), field-programmable gate arrays (FPGAs), general purpose processors, controllers, micro controller units (MCUs), microprocessors, or other electronics components, which can implement the image processing method described above.

An embodiment of the present disclosure also provides a computer-readable storage medium, which stores executable instructions for implementing the image processing method provided in the embodiments of the present disclosure when executed by a processor.

An embodiment of the present disclosure also provides a computer program product or a computer program. The computer program product or the computer program includes computer instructions, and the computer instructions can be stored in a computer-readable storage medium. The processor of a computer device can read and execute the computer instructions from the computer-readable storage medium, such that the computer device can execute the image processing method provided in the embodiments of the present disclosure.

An embodiment of the present disclosure also provides a computer-readable storage medium storing executable instructions. When the executable instructions are executed by the processor, it will cause the processor to execute the image processing method provided in the embodiments of the present disclosure.

The computer-readable storage medium may be a memory such as FRAM, ROM, PROM, EPROM, EEPROM, flash memory, magnetic surface memory, optical disk, or CD-ROM. The computer-readable storage medium may be a device including one or a combination of the above memories.

In some embodiments, the executable instructions may be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment. In sum, the term “unit” or “module” in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In an example, the executable instructions may, but do not necessarily, correspond to a file in a file system, and may be stored in a part of a file that saves another program or other data, for example, be stored in one or more scripts in a Hypertext Markup Language (HTML) file, stored in a file that is specially used for a program in discussion, or stored in a plurality of collaborative files (for example, be stored in files of one or more modules, subprograms, or code parts).

In an example, the executable instructions may be deployed for execution on one computing device, execution on a plurality of computing devices located at one location, or execution on a plurality of computing devices that are distributed at a plurality of locations and that are interconnected through a communication network.

The foregoing descriptions are merely embodiments of the present disclosure and are not intended to limit the protection scope of the present disclosure. Any modification, equivalent replacement, or improvement made without departing from the spirit and range of this application shall fall within the protection scope of the present disclosure.

What is claimed is:

1. An image processing method comprising:
- processing an initial image to obtain a target condition vector, wherein the target condition vector represents degradation feature information of the initial image;
- obtaining filter weights in different scale spaces based on the target condition vector;
- encoding the initial image to obtain a multi-scale feature map;
- processing the multi-scale feature map using the different filter weights to obtain a target residual image; and
- performing target processing on the initial image and the target residual image to obtain a target output image.

2. The image processing method of claim 1, wherein using different filter weights to process the multi-scale feature map obtained by encoding the initial image to obtain the target residual image includes:
- encoding the initial image into a first feature map set, the first feature map set including feature maps of different scales;
- converting the first feature map set into a second feature map set by using the corresponding filter weight, the second feature map set including feature maps of different scales; and
- sequentially decoding the feature maps in the second feature map set to obtain the target residual image.

3. The image processing method of claim 2, wherein converting the first feature map set into the second feature map set by using the corresponding filter weight includes:
- performing convolution processing on a first feature map included in the first feature map set by using a first filter weight to obtain a fourth feature map in the second feature map set;
- performing convolution processing on a second feature map included in the first feature map set by using a second filter weight to obtain a fifth feature map in the second feature map set; and
- performing convolution processing on a third feature map included in the first feature map set by using a third filter weight to obtain a sixth feature map in the second feature map set;
- wherein scale spaces corresponding to the first feature map, the second feature map, and the third feature map are different, and scale spaces corresponding to the fourth feature map, the fifth feature map, and the sixth feature map are different.

4. The image processing method of claim 3, wherein sequentially decoding the feature maps in the second feature map set to obtain the target residual image includes:
- decoding the sixth feature map to obtain a seventh feature map, the scale space corresponding to the seventh feature map being the same as the scale space of the fifth feature map;
- accumulating the seventh feature map and the fifth feature map and performing decoding processing to obtain an eighth feature map, the scale space corresponding to the eighth feature map being the same as the scale space of the fourth feature map; and
- performing residual processing after accumulating the eighth feature map and the fourth feature map to obtain the target residual image.

5. The image processing method of claim 1, wherein obtaining the filter weights in different scale spaces includes:
- extracting a third feature map set of the initial image by using the target condition vector and the initial image; and
- respectively performing convolution processing and residual processing on each feature map in the third feature map set to obtain the filter weights in different scale spaces.

6. The image processing method of claim 1, wherein processing the initial image to obtain the target condition vector includes:
- extracting degraded features of the initial image; and
- determining the target condition vector based on the degraded features.

7. The image processing method of claim 5, wherein extracting the third feature map set of the initial image by using the target condition vector and the initial image includes:
- using a first target condition vector to perform convolution and spatial feature conversion processing on the initial image to extract a first scale spatial feature map, the first target condition vector having the same shape as the first scale spatial feature map;
- using a second target condition vector to perform convolution and spatial feature conversion processing on the first scale spatial feature map to extract a second scale spatial feature map, the second target condition vector having the same shape as the second scale spatial feature map;
- using a third target condition vector to perform convolution and spatial feature conversion processing on the second scale spatial feature map to extract a third scale spatial feature map, the third target condition vector having the same shape as the third scale spatial feature map,
- the first target condition vector, the second target condition vector, and the third target condition vector being obtained based on conversion processing of the target condition vector.

8. The image processing method of claim 5, wherein extracting the third feature map set of the initial image by using the target condition vector and the initial image includes:

converting the target condition vector into a ninth feature map having the same shape as an input feature map of a different scale space of the initial image;

fusing different ninth feature maps with the input feature map of the corresponding scale space into a tenth feature map;

performing convolution processing on different tenth feature maps to obtain corresponding feature tensors; and using the feature tensors to perform spatial feature conversion processing on the input feature map corresponding to the scale space to obtain the third feature map set including a multi-scale space feature map.

9. An image processing device comprising:

a processing module configured to:

process an initial image to obtain a target condition vector, wherein the target condition vector represents degradation feature information of the initial image;

obtain filter weights in different scale spaces based on the target condition vector; and a determination module configured to:

encode the initial image to obtain a multi-scale feature map;

process the multi-scale feature map using the different filter weights to obtain a target residual image; and perform target processing on the initial image and the target residual image to obtain a target output image.

10. The image processing device of claim 9, wherein the determination module is further configured to:

encode the initial image into a first feature map set, the first feature map set including feature maps of different scales;

convert the first feature map set into a second feature map set by using the corresponding filter weight, the second feature map set including feature maps of different scales; and sequentially decode the feature maps in the second feature map set to obtain the target residual image.

11. The image processing device of claim 10, wherein the determination module is further configured to:

perform convolution processing on a first feature map included in the first feature map set by using a first filter weight to obtain a fourth feature map in the second feature map set;

perform convolution processing on a second feature map included in the first feature map set by using a second filter weight to obtain a fifth feature map in the second feature map set; and perform convolution processing on a third feature map included in the first feature map set by using a third filter weight to obtain a sixth feature map in the second feature map set;

wherein scale spaces corresponding to the first feature map, the second feature map, and the third feature map are different, and scale spaces corresponding to the fourth feature map, the fifth feature map, and the sixth feature map are different.

12. The image processing device of claim 11, wherein the determination module is further configured to:

decode the sixth feature map to obtain a seventh feature map, the scale space corresponding to the seventh feature map being the same as the scale space of the fifth feature map;

accumulate the seventh feature map and the fifth feature map and perform decoding processing to obtain an eighth feature map, the scale space corresponding to the eighth feature map being the same as the scale space of the fourth feature map; and perform residual processing after accumulating the eighth feature map and the fourth feature map to obtain the target residual image.

13. The image processing device of claim 9, wherein the processing module is further configured to:

extract a third feature map set of the initial image by using the target condition vector and the initial image; and respectively perform convolution processing and residual processing on each feature map in the third feature map set to obtain the filter weights in different scale spaces.

14. The image processing device of claim 9, wherein the processing module is further configured to:

extract degraded features of the initial image; and determine the target condition vector based on the degraded features.

15. The image processing device of claim 13, wherein the processing module is further configured to:

use a first target condition vector to perform convolution and spatial feature conversion processing on the initial image to extract a first scale spatial feature map, the first target condition vector having the same shape as the first scale spatial feature map;

use a second target condition vector to perform convolution and spatial feature conversion processing on the first scale spatial feature map to extract a second scale spatial feature map, the second target condition vector having the same shape as the second scale spatial feature map;

use a third target condition vector to perform convolution and spatial feature conversion processing on the second scale spatial feature map to extract a third scale spatial feature map, the third target condition vector having the same shape as the third scale spatial feature map, the first target condition vector, the second target condition vector, and the third target condition vector being obtained based on conversion processing of the target condition vector.

16. The image processing device of claim 13, wherein the processing module is further configured to:

convert the target condition vector into a ninth feature map having the same shape as an input feature map of a different scale space of the initial image;

fuse different ninth feature maps with the input feature map of the corresponding scale space into a tenth feature map;

perform convolution processing on different tenth feature maps to obtain corresponding feature tensors; and use the feature tensors to perform spatial feature conversion processing on the input feature map corresponding to the scale space to obtain the third feature map set including a multi-scale space feature map.

17. An electronic device comprising:

at least one processor;

and a memory communicatively coupled to the at least one processor, the memory storing an instruction set that, when executed, causes the processor to:

process an initial image to obtain a target condition vector, wherein the target condition vector represents degradation feature information of the initial image;

obtain filter weights in different scale spaces based on the target condition vector;

encode the initial image to obtain a multi-scale feature map;

process the multi-scale feature map using the different filter weights to obtain a target residual image; and perform target processing on the initial image and the target residual image to obtain a target output image.

18. The electronic device of claim 17, wherein the instruction set further causes the processor to:

encode the initial image into a first feature map set, the first feature map set including feature maps of different scales;

convert the first feature map set into a second feature map set by using the corresponding filter weight, the second feature map set including feature maps of different scales; and sequentially decode the feature maps in the second feature map set to obtain the target residual image.

19. The electronic device of claim 18, wherein the instruction set further causes the processor to:

perform convolution processing on a first feature map included in the first feature map set by using a first filter weight to obtain a fourth feature map in the second feature map set;

perform convolution processing on a second feature map included in the first feature map set by using a second filter weight to obtain a fifth feature map in the second feature map set; and perform convolution processing on a third feature map included in the first feature map set by using a third filter weight to obtain a sixth feature map in the second feature map set;

wherein scale spaces corresponding to the first feature map, the second feature map, and the third feature map being different, and scale spaces corresponding to the fourth feature map, the fifth feature map, and the sixth feature map being different.

20. The electronic device of claim 19, wherein the instruction set further causes the processor to:

decode the sixth feature map to obtain a seventh feature map, the scale space corresponding to the seventh feature map being the same as the scale space of the fifth feature map;

accumulate the seventh feature map and the fifth feature map and performing decoding processing to obtain an eighth feature map, the scale space corresponding to the eighth feature map being the same as the scale space of the fourth feature map; and perform residual processing after accumulating the eighth feature map and the fourth feature map to obtain the target residual image.

* * * * *